F. H. TREGO.
DIFFERENTIAL LOCK AND TRANSMISSION CONTROLLER.
APPLICATION FILED JUNE 23, 1915.
1,174,778.
Patented Mar. 7, 1916.
3 SHEETS—SHEET 3.
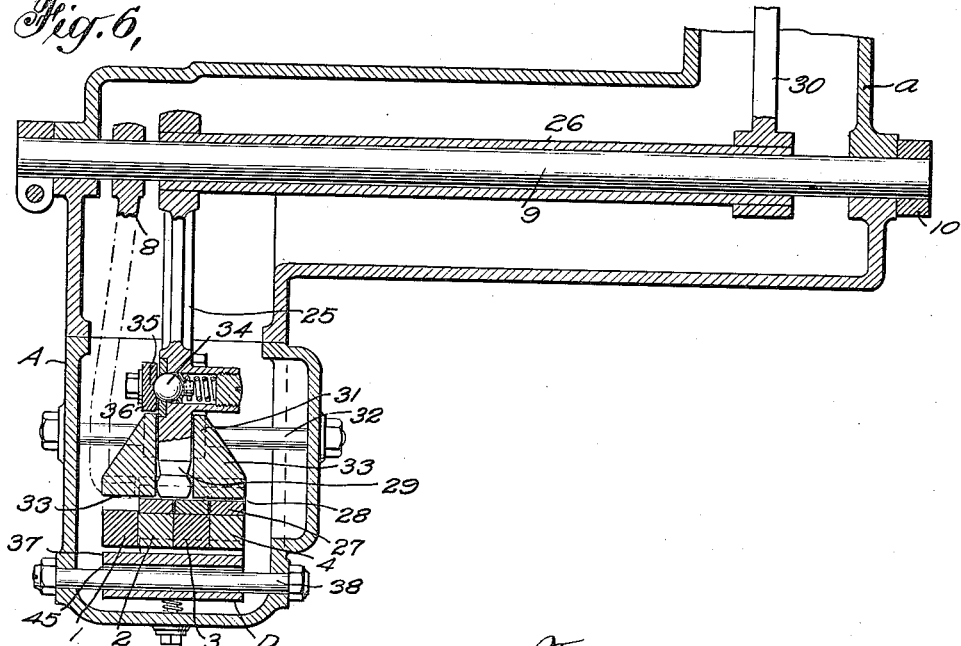
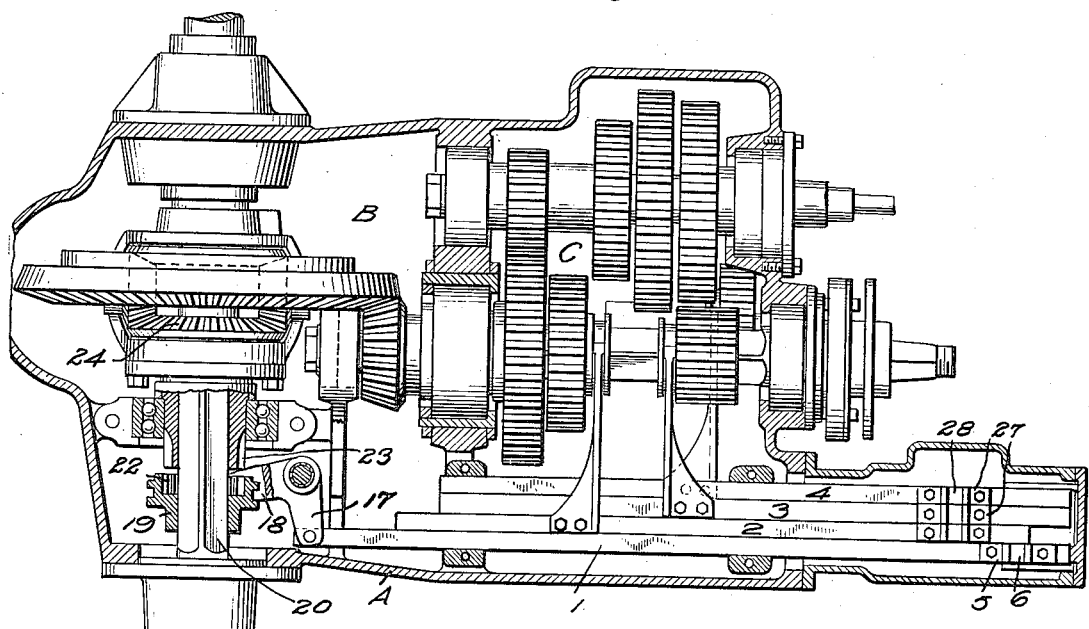
WITNESSES:
L. Hauerstein
C. Bradway
INVENTOR
Frank H. Trego
BY
ATTORNEY

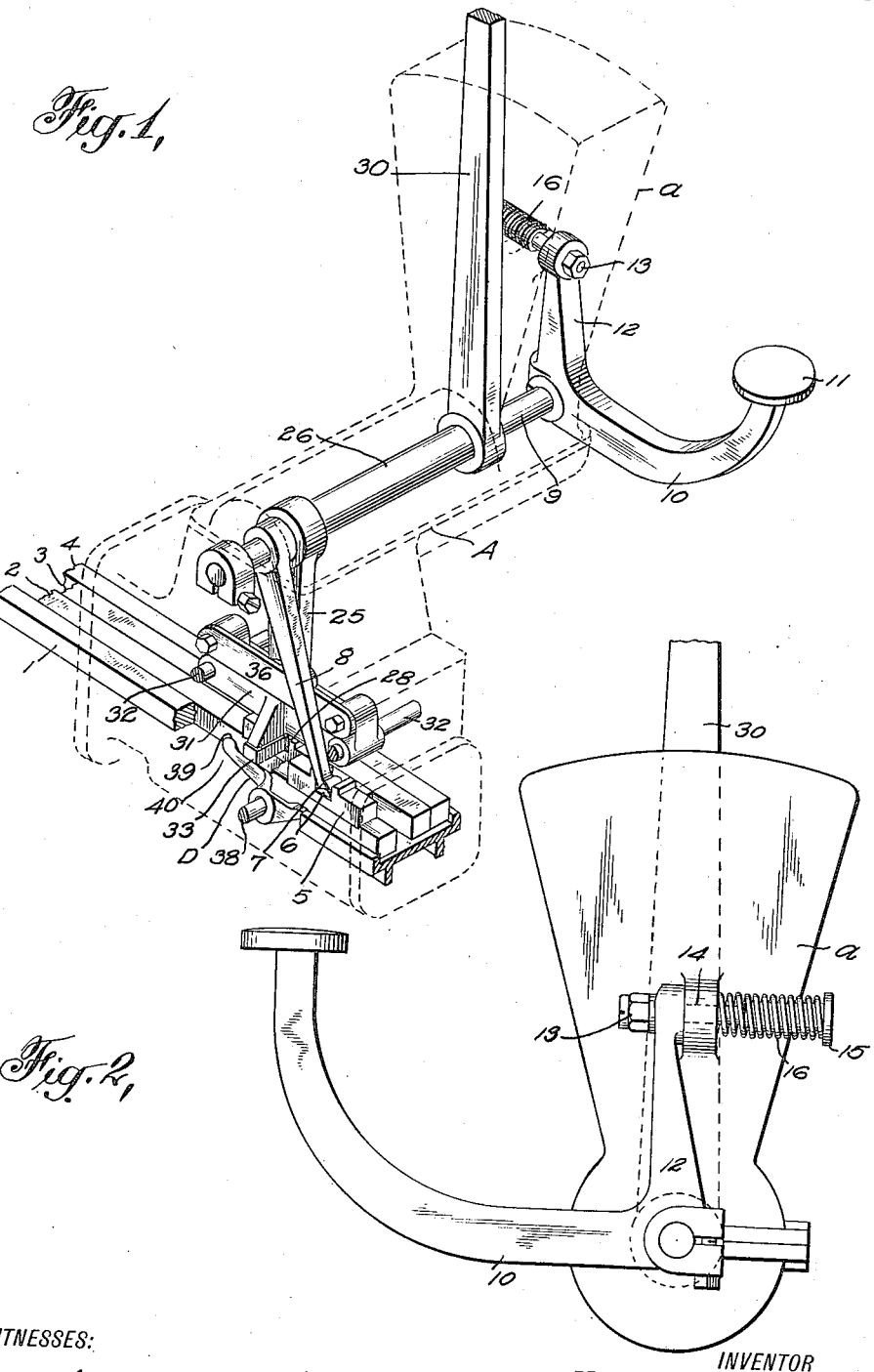

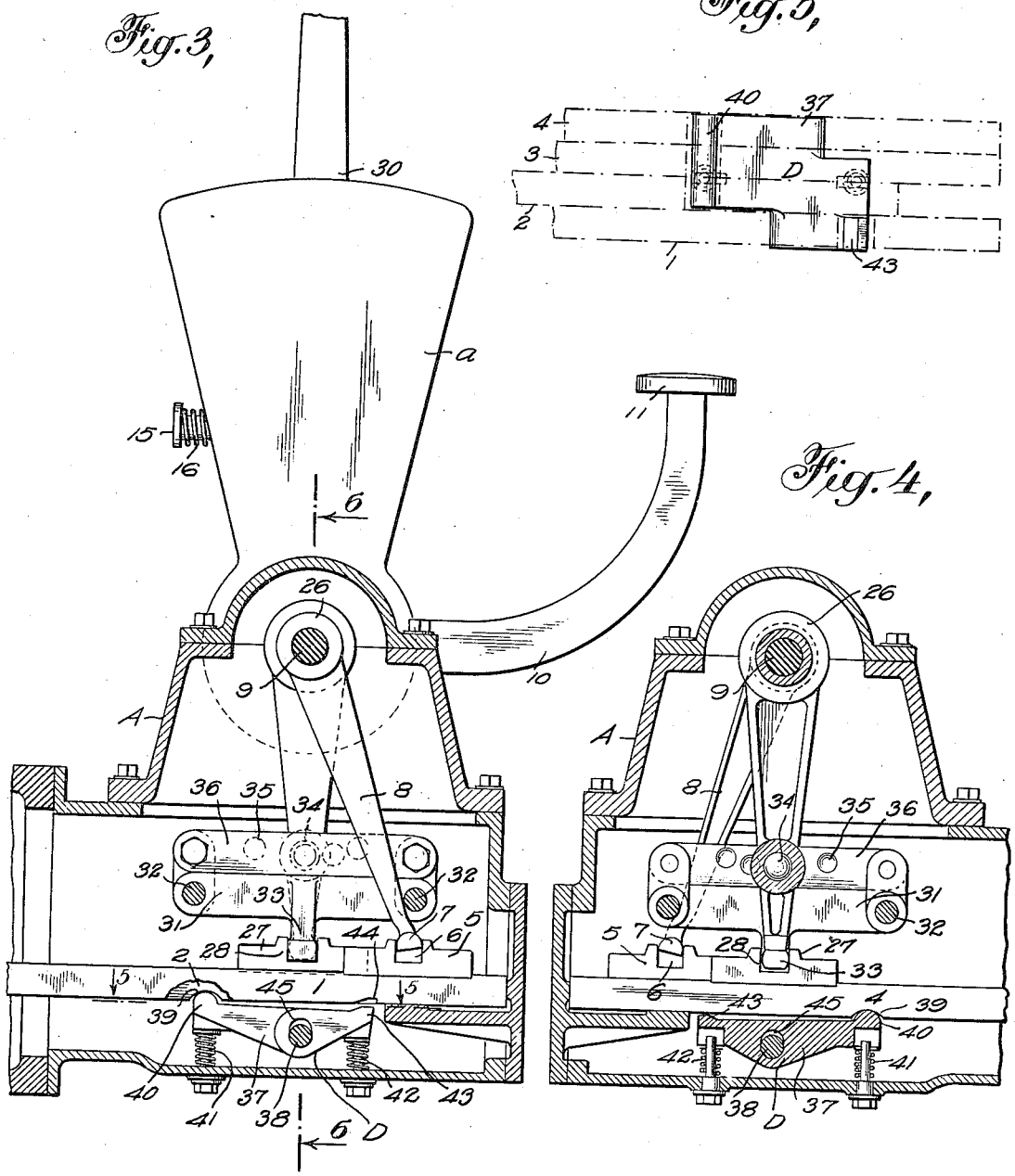

UNITED STATES PATENT OFFICE.

FRANK H. TREGO, OF SPRINGFIELD, MASSACHUSETTS.

DIFFERENTIAL-LOCK AND TRANSMISSION CONTROLLER.

1,174,778.

Specification of Letters Patent.  Patented Mar. 7, 1916.

Application filed June 23, 1915. Serial No. 35,843.

*To all whom it may concern:*

Be it known that I, FRANK H. TREGO, a citizen of the United States, and a resident of Springfield, in the county of Hampden and State of Massachusetts, have invented a new and Improved Differential-Lock and Transmission Controller, of which the following is a full, clear, and exact description.

This invention relates to change speed and differential gears for automobiles and the like, and more particularly to transmissions of that type in which a plurality of selective gear-shifting rods are employed.

The invention has for its general objects to improve and simplify the construction and operation of apparatus of the character referred to so as to be reliable and efficient in use, of durable and substantial design and having locking means whereby only one gear can be thrown in at a time and when the gears of the transmission are in meshing relation the differential gearing cannot be thrown in.

A further object of the invention is the provision of a differential lock which is controlled by a lever, preferably, although not necessarily, operated by a foot button, the said lock being associated with the selective rods of the transmission, whereby the latter are operative to prevent throwing in the differential gearing as long as any rod is out of neutral position.

Still another object of the invention is the provision of a single gear-shifting lever which is moved into engagement with any of the selective rods, and associated therewith is a locking device for preventing all the rods except the ones selected from being operated, so that there is no danger of any but the selected gears being thrown into mesh.

With such objects in view, and others which will appear as the description proceeds, the invention comprises various novel features of construction and arrangement of parts which will be set forth with particularity in the following description and claims appended hereto.

In the accompanying drawings, which illustrate one embodiment of the invention and wherein similar characters of reference indicate corresponding parts in all the views, Figure 1 is a perspective view of the selecting rods with their locking and operating means; Fig. 2 is a side view showing the controller for the differential lock; Fig. 3 is a sectional view of the parts shown in Fig. 1; Fig. 4 is a sectional view, viewing the parts from the opposite side from Fig. 3; Fig. 5 is a plan view on the line 5—5, Fig. 3, showing the interlocking device between the actuating rod of the differential lock and selecting rods of the transmission gearing; Fig. 6 is a vertical sectional view on the line 6—6, Fig. 3; and Fig. 7 is a horizontal sectional view showing the transmission and differential gearings.

Referring to the drawings, 1 designates the actuating rod for the differential lock, and 2, 3 and 4 the selecting rods for the shifting gears of the transmission mechanism. On the rod 1 is a block 5 having a notch 6 into which engages the lower end 7 of a swinging arm 8. This arm is fastened to a horizontal shaft 9 suitably mounted in a casing or frame A, and on this shaft is a lever 10 having a foot button 11 which is disposed at a suitable point in the footboard of an automobile so that the lever can be pressed downwardly by the foot so as to shift the rod 1 in a direction to lock in the differential gearing. This lever 10 has an upwardly extending arm 12 through the upper extremity of which extends a bolt 13 that slides through a lug 14 on the side of the upstanding extension *a* of the frame A. Surrounding the bolt 13 and interposed between the head 15 and the lug 14 is a helical compression spring 16 which raises the lever 10 after it has been depressed and causes the differential gearing to be unlocked.

In Fig. 7 the rod 1 is shown with its rear end connected with a bell-crank lever 17 fulcrumed in the rear part of the casing A, and this lever has a forked arm 18 which engages a collar 19 to shift the same longitudinally on the squared portion 20 of an axle or other shaft 21. This collar has internal teeth 22 that are adapted to mesh with teeth 23 on the hub of one of the oppositely rotating bevel gears 24 of a differential gearing B. When the rod 1 in its forward position, as shown in Fig. 7, the differential gearing is unlocked; that is to say, the bevel gear 24 is not keyed or connected with the shaft 21, but when the rod 1 is shifted rearwardly, the clutch element 22 engages the clutch element 23, so that the shaft 21 is connected or locked to the differential gearing.

The selecting rods 2, 3 and 4 are separately fastened to a sleeve 26 which is rotatable and longitudinally slidable on the shaft 9, and on these rods 2, 3 and 4 are blocks 27 having notches 28 into which the lower end 29 of the arm or lever 25 engages, as shown in Fig. 6. The sleeve 26 is actuated by the gear shifting lever 30 which extends upwardly in and out of the extension $a$ of the transmission casing A. Associated with the arm 25 is a lock 31 which is laterally slidable on parallel rods 32 disposed above the selecting rods and fastened in the casing A. This slide 31 has lugs 33 which are adapted to engage in recesses 28 of those selecting rods 2, 3 and 4 which are not to be actuated when the arm 25 is moved. When the shifting lever 30 is in neutral position the lower end of the arm 25 will aline with the locking lugs 33, and by shifting the lever 30 axially of the shaft 9, the lower end of the arm 25 can be engaged with any of the three selecting rods while the locking lugs 33 will prevent the other rods from being dragged along with the shifted rod, and as a result only the desired gears can be thrown into mesh. To facilitate the movement of the arm 25 through the several steps, a spring-pressed pawl or equivalent device 34 is carried by the arm 25 and is adapted to engage shallow recesses 35 in a plate 36 which is fastened to the selective rod lock 31, the spring-pressed pawl 34 and depressions forming yielding stops for facilitating the obtaining of the various positions of the shifting lever 30 when the same is swung back and forth to throw in and out the gears of the transmission mechanism. The transmission C is of any approved construction and the shiftable gears thereof are connected with the selecting rods 2, 3 and 4 in the usual manner.

It is essential that the parts of the transmission mechanism be in neutral position before the differential mechanism is locked in, and for this purpose an interlocking device D is employed. This device comprises a rocker 37 which is disposed below the rods 1, 2, 3 and 4 and fulcrumed at an intermediate point on a pivot 38 fastened in the casing A. The under surfaces of the rods 2, 3 and 4 are provided with notches 39 into which extends the extremity 40 of the rocker 37 when the notches 39 are in alinement, the alinement taking place only when the lever 30 is in neutral position. Springs 41 and 42 are arranged under the opposite ends of the rocker, but they are so arranged or proportioned that when the notches 39 of the rods 2, 3 and 4 are in alinement, the rear end of the rocker will be raised and the dog or pawl end 43 of the rocker will be lowered or freed from the abutment or notch 44 in the bottom of the rod 1. This permits the rod 1 to be operated so as to lock in the differential gearing. After the differential gearing is locked in, any of the rods 2, 3 and 4 can be shifted, and in so doing, the notch 39 of the shifted rod acts as a cam on the extremity 40 and depresses the rocker, which is capable of yielding downwardly because the opening 45 for the fulcrum 38 is elliptical in cross-section.

From the foregoing description taken in connection with the accompanying drawings, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made when desired as fall within the scope of the appended claims.

Having thus described my invention, I claim as new and desire to secure by Letters Patent:

1. The combination of a differential gearing, a device for rendering the same operative, a transmission gearing, means for shifting the gears thereof, and an interlocking device for preventing the operation of the first-mentioned device except when the gears of the transmission gearing are in neutral position.

2. The combination of a differential gearing, a device for rendering the same operative, a rod for operating the device, a transmission gearing, selective rods for shifting the gears thereof, and an interlocking device for insuring the neutral position of the selective rods before the first-mentioned rod can throw the differential gearing into operative condition.

3. A differential gearing, shafts adapted to be driven thereby, one-half of the differential gearing being permanently connected with one of the shafts, the other half of the differential gearing being normally disconnected from the other shaft, a clutch element feathered on such other shaft and adapted to lock the same to the adjacent half of the differential gearing, an actuator for the clutch element, a transmission gearing, means for shifting the gears of the transmission gearing, and an interlocking device for preventing the clutch element from being thrown to operative position when any of the shifting gears of the transmission mechanism are in meshing position.

4. The combination of a differential gear, a device for rendering the same operative, an actuating rod for the device, a transmission gearing, selective rods for the shiftable gears of the transmission gearing, a pivoted interlocking device disposed adjacent the rods, and means on the selective rods for interlocking the said device with the first-mentioned rod when any of the selective rods is in non-neutral position.

5. The combination of a differential gearing, a device for rendering the gearing operative, an actuating rod for the said device, a transmission gearing, selective rods for moving the shiftable gears of the transmission gearing, an interlocking device, means on the first-mentioned rod with which the device is adapted to engage for preventing the movement of such rod, and means on the selective rods for throwing the interlocking device into locking position with respect to the first mentioned rod when any selective rod is out of neutral position.

6. The combination of a differential gearing, a device for rendering the gearing operative, an actuating rod for the said device, a transmission gearing, selective rods for moving the shiftable gears of the transmission gearing, an interlocking device, means on the first-mentioned rod with which the device is adapted to engage for preventing the movement of such rod, means on the selective rods for throwing the interlocking device into locking position with respect to the first mentioned rod when any selective rod is out of neutral position, a fulcrum on which the interlocking device is loosely mounted for bodily and pivotal movement, and spring means for urging the interlocking device into engagement with the rods.

7. The combination of a differential gearing, a device for rendering the same operative, an actuating rod therefor, an arm connected with the rod for moving the same, a shaft for the arm, an operating lever connected with the shaft, a transmission gearing, selective rods for the shiftable gears of the transmission gearing, an arm engageable with any of the selective rods and said arm being mounted to move longitudinally of the said shaft, a gear-shifting lever connected with the last-mentioned arm, and means dependent upon the neutral position of the selective rods for permitting the first rod to operate.

8. The combination of differential gearing, means for throwing the same into and out of operative condition, said means including a shaft, a sleeve mounted on the shaft, a gear-shifting lever connected with the sleeve, an arm on the sleeve, a transmission gearing, and a plurality of selective rods with any of which the arm is engageable for moving the sleeve longitudinally of the shaft, and an interlocking device controlled by the selective rods for controlling the operation of the said means.

9. The combination of differential gearing, means for throwing the same into and out of operative condition, said means including a shaft, a sleeve mounted on the shaft, a gear-shifting lever connected with the shaft, a sleeve, an arm on the sleeve, a transmission gearing, a plurality of selective rods with any of which the arm is engageable for moving the sleeve longitudinally of the shaft, a locking device movable with the arm when the latter moves longitudinally of the shaft for engaging all of the selective rods except the one with which the arm engages, and an interlocking device for preventing operation of the said means when any of the gears of the transmission gearing are in mesh.

10. The combination of a differential gearing, a device for rendering the same operative, a transmission gearing including shiftable gears, and means for preventing the throwing in of the differential gear when any of the shiftable gears of the transmission gearing are out of neutral position.

11. The combination of a differential gearing, a longitudinally movable element for throwing the gears into and out of operative condition, a transmission gearing including a longitudinally movable element, and an interlocking device between the elements, whereby the first is prevented from moving out of its initial position when the second element is out of neutral position.

In testimony whereof I have signed my name to this specification in the presence of two subscribing witnesses.

FRANK H. TREGO.

Witnesses:
 FRED H. RICH,
 SIDNEY A. SAUNDERS.